H. E. TOWNSEND.
WATER HEATER.
APPLICATION FILED AUG. 21, 1911.

1,193,740.

Patented Aug. 8, 1916.
2 SHEETS—SHEET 1.

FIG.I.

WITNESSES:

INVENTOR
Harry E. Townsend.

H. E. TOWNSEND.
WATER HEATER.
APPLICATION FILED AUG. 21, 1911.

1,193,740.

Patented Aug. 8, 1916.
2 SHEETS—SHEET 2.

WITNESSES:

INVENTOR
Harry E. Townsend.

UNITED STATES PATENT OFFICE.

HARRY E. TOWNSEND, OF NEW YORK, N. Y.

WATER-HEATER.

1,193,740.

Specification of Letters Patent.   Patented Aug. 8, 1916.

Application filed August 21, 1911. Serial No. 645,109.

*To all whom it may concern:*

Be it known that I, HARRY E. TOWNSEND, a citizen of the United States, residing in the borough of Brooklyn, city of New York, county of Kings, and State of New York, have invented certain new and useful Improvements in Water-Heaters, of which the following is a specification, reference being had therein to the accompanying drawings, forming part thereof.

My invention relates to water heaters of the partly submergible type.

Objects of my invention are compactness and simplicity of construction, easiness and inexpensiveness of manufacture, a high degree of efficiency, convenience of use and other objects and advantages which will hereinafter appear.

My invention includes features of construction and combinations of parts as will appear from the following description.

I shall now describe the water heater illustrated in the accompanying drawings embodying my invention and shall thereafter point out my invention in claims.

Figure 1:
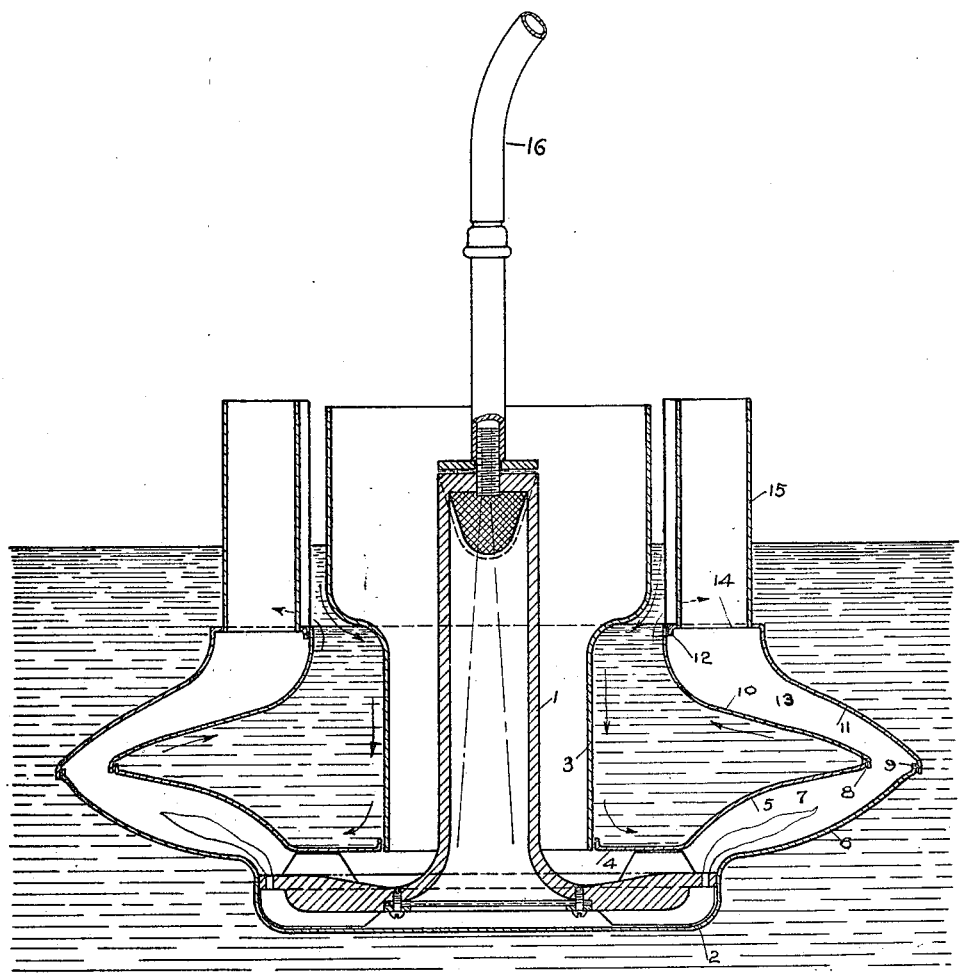
Figure 2:
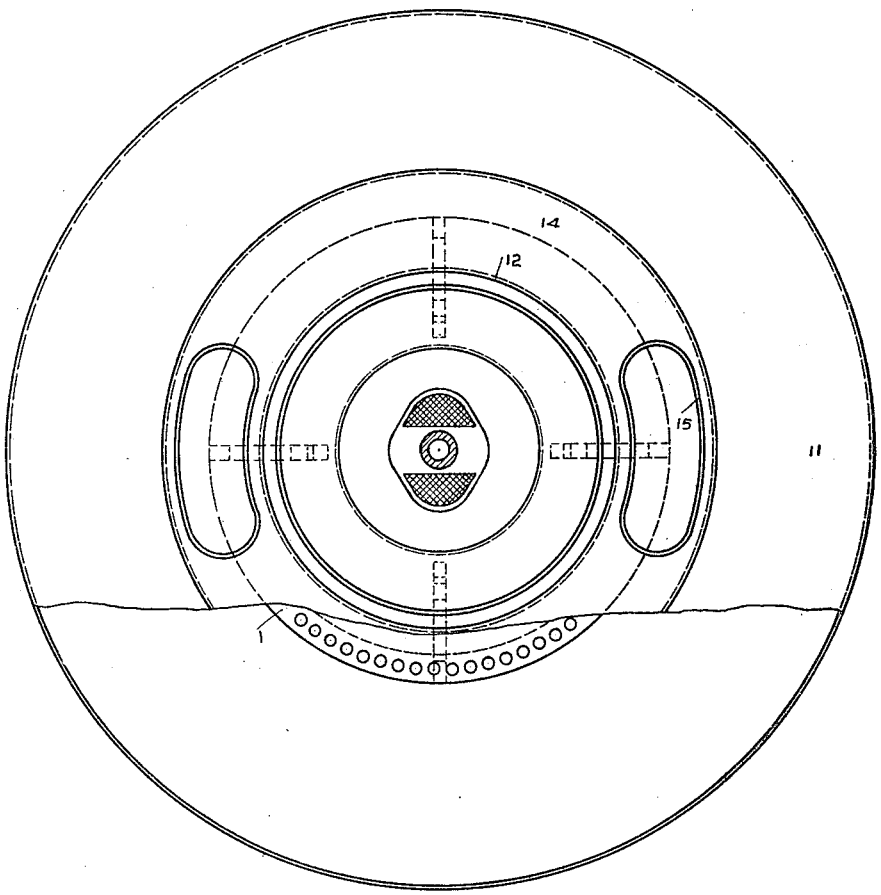

Figure 1 is a central vertical section of the water heater embodying my invention, and Fig. 2 is a plan of the same with the upper portion of the casing partly broken away.

In the construction shown in the drawings, a burner 1 has a central upright mixing tube which is flanged outwardly at its lower end to provide an enlarged burner base shown as provided adjacent its margin with apertures forming points of combustion. The burner base is inclosed between the upper and lower portions 2 and 4 of the spaced inner and outer walls of a double-walled casing which forms, as clearly shown in the drawings, a water-containing chamber having a contracted open mouth. From the outer periphery of the burner base the upper and lower spaced wall portions 5 and 6 of the casing flare outwardly so that the lower portion of the double-walled casing is of substantially dish-like or bowl form. The upwardly flaring spaced wall portions 5 and 6 form a combustion chamber 7. In the construction illustrated in the drawings the inner flaring wall portion 5 is shown as forming an integral continuation of the upper wall portion 4; and similarly the outer wall flaring portion 6 forms an integral continuation of the bottom 2. The wall portions 2 and 6 form a lower and outer dish-like member, and the wall portions 4 and 5 form an upper and inner dish-like member spaced from the lower and outer member.

An upper and inner inwardly tapered wall member 10 is joined at its lower peripheral edge to the periphery of the inner flaring wall portion 5. An upper and outer inwardly tapered wall member 11 has its lower and outer edge joined to the peripheral edge of the flaring outer wall portion 6. The inwardly tapered upper wall members 10 and 11 may be said to be of inverted dish-like form and are spaced apart to provide between them a receiving chamber 13 which communicates with the combustion chamber 7. In the construction illustrated in the drawings, the receiving chamber 13 is provided at its top with a flat annular cover-plate 14 which is shown as formed in one piece with the outer inwardly tapered wall member 11, the closure plate 14 being shown as slightly flanged downwardly at 12 and joined to the upper edge of the inner tapered wall member 10. Exit flues 15, shown as two in number, diametrally arranged, are carried by and project upwardly from the cover-plate 14 and are in communication with the receiving chamber 13 to form escapes therefrom for the products of combustion.

A down-draft air-supply flue 3 projects upwardly from the central wall portion 4 of the inner and lower casing member and around and in spaced relation to the mixing tube of the burner 1. The air-supply flue 3 is shown as enlarged in its upper portion so as to form a shoulder about opposite the upper edge of the inwardly tapered inner wall member 10, and at this shoulder on the air-supply flue 3 an open annular space is formed which provides an annular restricted combined inlet and outlet passage for the water to and from the imperforate water-containing chamber formed within the inner wall of the double-walled casing. Combustible gas may be supplied to the upper end of the mixing tube of the burner 1 by means of a flexible tube 16 as appears in the drawings.

In operation the heater will float in the water with the cover-plate 14 submerged, but with the air-supply flue 3 and escape flues 15 projecting above the surface of the water, as appears in Fig. 1. The escaping gas may be ignited above one of the escape flues 15.

It will be readily understood that the outward flaring of the combustion chamber 7, the inward taper of the receiving chamber 13, together with the submerged cover-plate 14, will result in a very large amount of the heat being taken up by the water and particularly by that which is contained within the water-containing chamber. In this connection it should be noted that the air-supply flue 3, which forms the inner wall of the annular water-containing chamber, will be kept comparatively cool by the descending current of fresh air, while, on the other hand, the casing wall portions 4, 5 and 10, which form respectively the bottom, the outwardly flaring and the inwardly tapered walls of the water chamber, are highly heated by the combustion in the combustion chamber 7 and by the hot products of combustion in the receiving chamber 13. The result in operation of this construction is that strong convection currents will be set up in the water contained in the water chamber, in which cool water will enter this chamber and descend therein adjacent to the cool surface of the air-supply flue 3 and will pass outwardly and rise adjacent of the hot inner surfaces of the upwardly inclined flaring and tapered wall portions 5 and 10 and will flow out of the water-containing chamber adjacent to the upper edge of the wall portion 10. As these convection currents constantly renew the supply of water contained within the water-containing chamber and also cause it to impinge most effectively upon the heated surfaces, the entire body of water in which the heater floats becomes heated very quickly.

It is obvious that various modifications may be made in the construction shown in the drawings and above particularly described within the principle and scope of my invention.

I claim:

1. In a water heater, the combination of a casing having spaced inner and outer walls, a burner centrally arranged relative to the casing and having combustion points between the walls thereof, a central down-draft flue attached to the casing and communicating with the space between the casing walls, the outer wall of the casing being upwardly inclined from the burner to its outer periphery and inwardly inclined therefrom toward the down-draft flue, the inner wall of the casing being upwardly inclined from the burner to its outer periphery and inwardly inclined therefrom to a junction with the outer wall near to but spaced from the down-draft flue to provide a water-containing chamber within the inner wall of the casing having a restricted combined inlet and outlet water passage between the contracted inner wall of the casing and the down-draft flue, said casing walls being spaced apart to provide an annular combustion space adjacent to the burner and an annular passage for the products of combustion in communication therewith, and an escape flue attached to the casing and in communication with the said annular passage for the products of combustion.

2. In a water heater, the combination of a casing, a burner centrally arranged therein, the casing comprising concentrically disposed inner and outer walls spaced apart to provide between them a burner space and a combustion chamber adjacent to the burner and a passage for the gases of combustion in communication with the combustion chamber, a central down-draft air flue communicating with the burner space of the casing, the inner wall of the casing being turned in toward but spaced away from the down-draft flue to provide a water chamber having a restricted combined inlet and outlet water passage between the top of the casing and the down-draft flue, and an escape flue communicating with the passage for the gases of combustion.

3. In a water heater, the combination of a casing and a burner centrally located therein, the said casing comprising inner and outer lower members of dish-like contour spaced apart to provide between them a space for the burner and a combustion space adjacent the outer edge of the burner, and inner and outer upper members of inverted dish-like form joined at their lower edges to the upper edges of the inner and outer lower members respectively and joined together at their upper edges to form within said inner members a water-containing chamber open at the top for ingress and egress of water and said upper members being spaced apart to provide between them a passage for the gases of combustion in communication with the combustion space.

4. A partly submergible water heater comprising a burner having a substantially upright mixing tube and an enlarged base provided at its outer margin with points of combustion, a double-walled burner casing inclosing the burner base between its walls and flaring outward therefrom in substantially bowl-shape to provide a flaring combustion chamber between its inner and outer walls and tapering inward from the top of the combustion chamber and joined at the top to form between the walls a tapered receiving chamber for the hot products of combustion, the inner wall of the casing forming an imperforate water-containing chamber, a down-draft air-supply flue communicating with and projecting up from the burner-containing casing around and spaced from the mixing tube and also spaced from the top of the inner wall of the casing to provide an open combined inlet and outlet water passage to the water-containing chamber, and an exit flue communicating with and projecting up from the receiving chamber for the escape of the products of combustion.

5. A partly submergible water heater comprising a burner having a substantially upright central mixing tube and a concentric enlarged base provided at its periphery with points of combustion, a casing having spaced inner and outer walls inclosing the burner base and flaring upward from the periphery of the burner base to form an annular combustion chamber and tapering upward from the top of the combustion chamber and joined at the top to form an annular receiving chamber for the hot products of combustion, a down-draft air-supply flue communicating with the burner-containing space between the walls of the casing and projecting up concentrically between and in spaced relation to the mixing tube of the burner and the top of the inner wall of the casing, the inner wall of the casing and the air-supply flue providing an imperforate annular water-containing chamber having an annular restricted combined inlet and outlet water passage between the contracted inner wall of the casing and the down-draft flue, and a plurality of circumferentially spaced exit flues communicating with and projecting up from the receiving chamber for the escape of the products of combustion.

6. In a partly submergible water heater, the combination of a double-walled water-containing chamber having a submergible contracted open mouth adapted to serve as a combined inlet and outlet water passage for the chamber, and means for applying heat between the walls of the chamber.

7. In a partly submergible water heater, the combination of a double-walled imperforate water-containing chamber having at the top a contracted open mouth and enlarged below the top both interiorly and exteriorly, the walls of the chamber being spaced apart throughout the chamber, a burner between the spaced walls of the chamber, a down-draft air-supply flue passing down through the open mouth of the chamber and communicating at the bottom of the chamber with the space between the walls of the chamber, and a fuel-supply conduit for the burner passing down through the air-supply flue.

8. In a partly submergible water heater, the combination of a double-walled water-containing chamber having a contracted open mouth, a down-draft air-supply flue passing down through the open mouth of the chamber into communication with the space between the walls of the chamber at the bottom of the chamber, an escape flue communicating with the space between the walls of the chamber at the top and extending above the water level, a burner between the spaced walls of the chamber, and a fuel-supply conduit for the burner.

In testimony whereof, I have signed this specification in the presence of two subscribing witnesses.

HARRY E. TOWNSEND.

Witnesses:
MARY ABRAMS,
LILLIE C. COUNSELLOR.

Copies of this patent may be obtained for five cents each, by addressing the "Commissioner of Patents, Washington, D. C."